Oct. 2, 1934.  H. G. GUYLE  1,975,572
SWEET CLOVER SEED HARVESTER
Original Filed Nov. 16, 1931  3 Sheets-Sheet 1
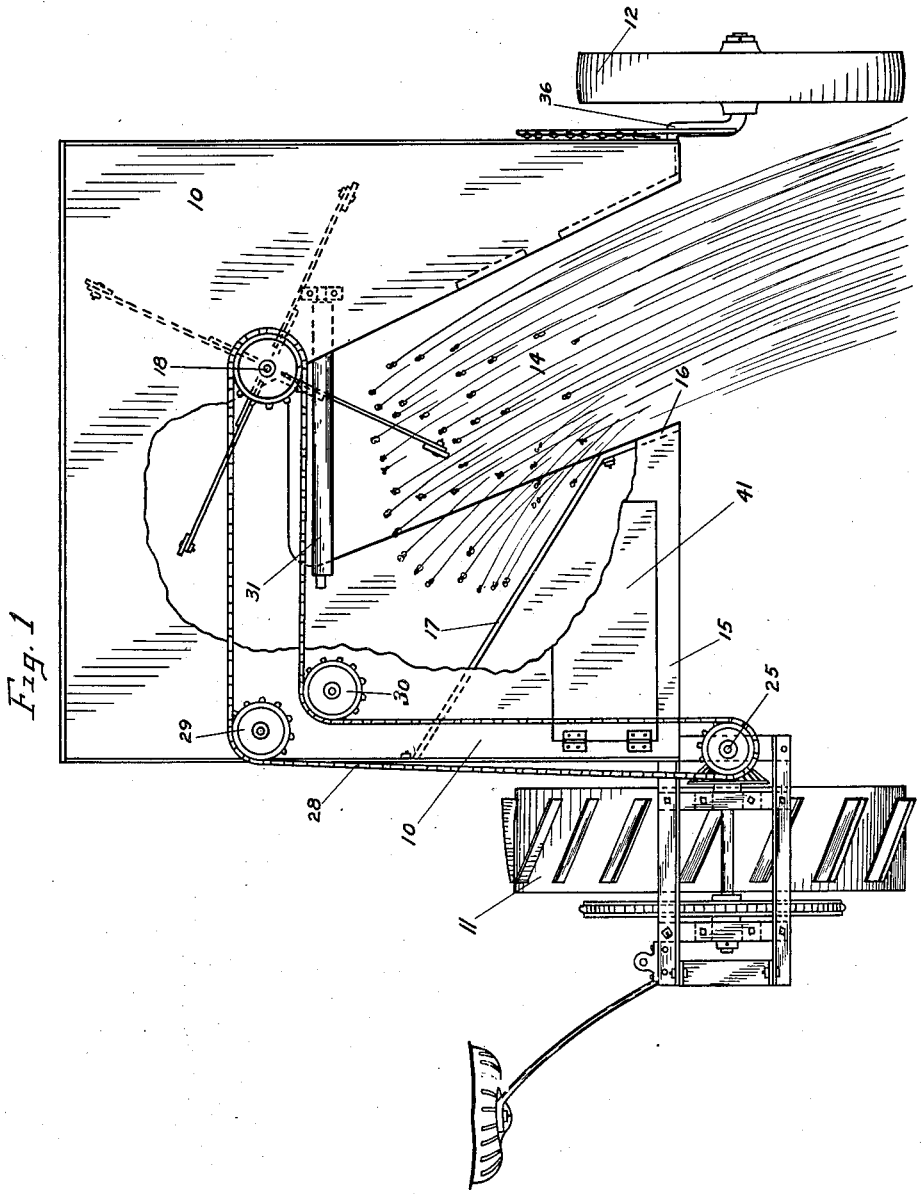
H.G.GUYLE Inventor
By Emil F Lange
Attorney

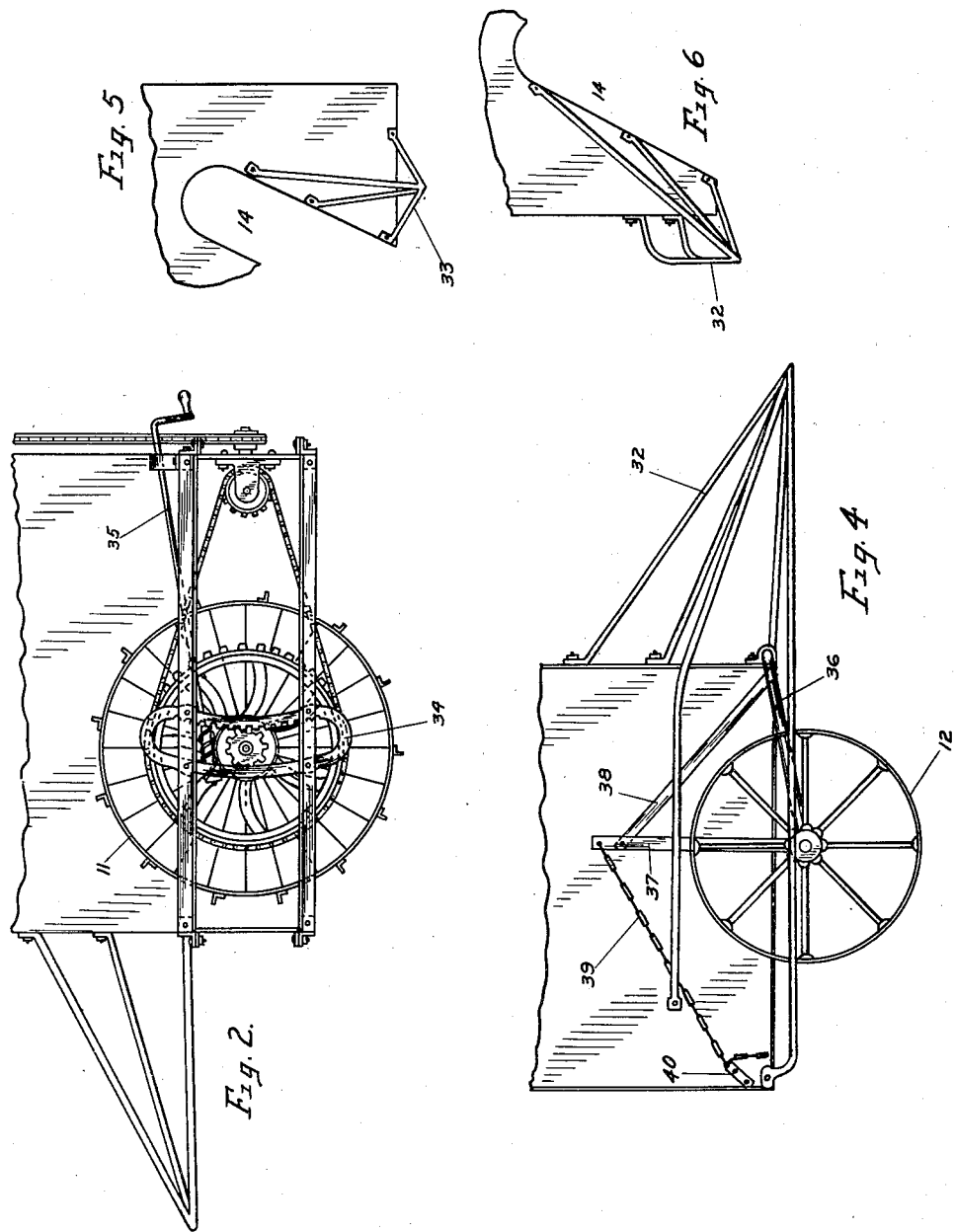

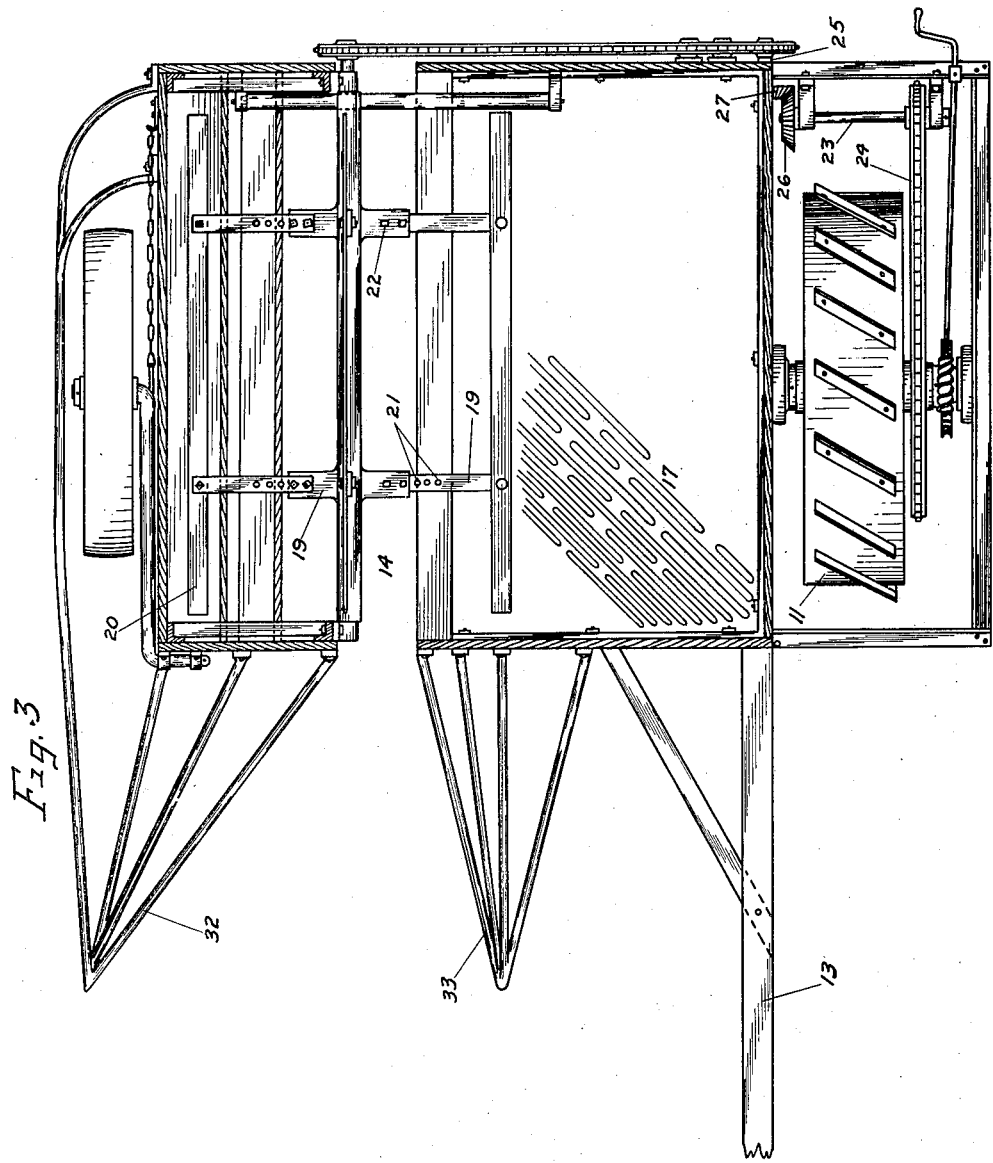

Patented Oct. 2, 1934

1,975,572

UNITED STATES PATENT OFFICE 1,975,572

SWEET CLOVER SEED HARVESTER

Henry G. Guyle, Sargent, Nebr.; Richard I. Guyle, administrator of said Henry G. Guyle, deceased, assignor of fifty-one per cent to Everett Satterfield, Taylor, Nebr., and forty-nine per cent to Martha Neel, Rachel Schipper, and Richard I. Guyle Application November 16, 1931, Serial No. 575,433
Renewed March 6, 1934

2 Claims. (Cl. 56—126)

My invention relates to harvesting machines for sweet clover and other seed, its object being the provision of a machine for removing the seed from the plants and for leaving the straw and other refuse in the field.

Another object of my invention is the provision of a clover seed harvester which will operate automatically as the machine is drawn over a field and which will remove the ripe seed from the stems of the plants and collect the seed in a bin or other receptacle from which the seed may be subsequently removed.

The invention also seeks to improve the construction and arrangement of parts of a harvester of this class in order that the machine may operate efficiently and economically without requiring extensive and frequent repairs or adjustments.

Having in view these objects and others which will be pointed out in the following description, I will now refer to the drawings, in which Figure 1 is a view in rear elevation of a clover seed harvester constructed in accordance with my invention.

Figure 2 is a view in side elevation of a portion of the clover seed harvester as seen from the drive wheel side, the view also showing some of the guides.

Figure 3 is a top plan view of my clover seed harvester with parts in horizontal section.

Figure 4 is a view in side elevation of a portion of my clover seed harvester as seen from the grain wheel side, one of the guides being also shown.

Figure 5 is a view in front elevation of the guide shown in Figure 2 and showing also a fragment of the front wall of the grain house.

Figure 6 is a view in front elevation of the guide shown in Figure 4.

In carrying out the invention, I have provided a seed house or covered body 10 which is supported upon and secured to the main frame of the implement. The main frame is supported on ground wheels, one of which is a drive wheel 11 and the other a grain wheel 12, the latter being designed to simply support the outer end of the main frame. Secured to the main frame at its front end is a pole or other suitable draft device 13 to which power may be applied for drawing the implement over the field. This draft device 13 may be modified as is found necessary or desirable. The sides of the seed house are continuous and imperforate throughout their extent and they are connected by a roof and also by the upper part of the rear wall. The seed house is constructed with a passageway 14 extending from front to rear at one side of the median longitudinal vertical plane of the seed house, the machine being designed to be driven over the field in such position that the standing stems of the plants will be guided into and through the front entrance of the passageway 14 to emerge from the rear exit of the passageway through the seed house. The passageway 14 is inclined as best seen in Figure 5 so that the stems will enter and pass through the passageway in a slightly leaning position.

The floor 15 of the seed house extends from one side wall of the seed house to the passageway 14. At the inner edge of the floor 15 is a short partition or guard rail 16 which with the floor defines a bin within which the seed may be received. A series of parallel rods 17 extend between the upper edge of the guard rail 16 and the side wall of the seed house and these parallel rods are inclined relative to both the transverse and the longitudinal planes of the seed house as will be understood upon reference to Figures 1 and 3. The parallel rods 17 form a grid or grizzly upon which the stems of sweet clover may be beaten to dislodge the seed therefrom so that the seed falls through between the bars 17 and into the seed receptacle.

The shaft 18 is journaled in the front and rear walls of the seed house 10 and at one side of the center line of draft of the implement. The shaft is provided with with a plurality of radially extending extensible arms 19 which carry beater bars 20. It should be noted that the axis of the beater is parallel to the line of draft of the implement. The stalks which pass through the passageway 14 during the travel of the implement are beaten in the manner shown in Figure 1 so that their heads are forced against the grid or grizzly formed from the rods 17. The radial arms 19 are purposely made extensible so that the effective radius of the beater may be varied according to the height of the crop and to meet other conditions. As shown in Figure 3, the arms 19 include pairs of members having overlapping ends provided with a plurality of apertures 21 through which securing bolts 22 are inserted in an obvious manner.

The beater is driven from the drive wheel 11 through the mechanism best shown in Figures 1 and 3. Immediately in the rear of the drive wheel 11 is a shaft 23 which is parallel to the axle of the wheel 11. The axle of the wheel 11 as well as the shaft 23 each carry a sprocket wheel, the two sprocket wheels being connected by a sprocket chain 24 for driving the shaft 23. A stub shaft 25 is journaled in the main frame and the shafts 23 and 25 are provided with intermeshing bevel gears 26 and 27. The shaft 25 carries a sprocket wheel for engaging the sprocket chain 28, this sprocket chain being trained over another sprocket wheel on the beater shaft 18. The frame of the seed house is also provided with journals for two idler sprocket shafts 29 and 30 whose primary function is to keep the sprocket chain 28 away from the passageway 14 and to otherwise keep the sprocket chain 28 out of the way of the other mechanism. One of these idlers also functions as a chain tightener.

Across the top of the rear exit of the passageway 14, a horizontal roller 31 is mounted on the rear wall of the seed house below the beater shaft 18 and out of the path of the beater arms, the relationship of parts being best shown in Figure 3. This roller 31 is free in its bearings and is rotated only when the stems of the plants are tall enough to come in contact with it when passing through the passageway 14 of the implement. This does two things. It bends the stems forward and holds them longer in front of the beater and it also keeps them away from the beater shaft thus avoiding tangling or winding up.

On the front of the machine are dividing fenders and guides 32 and 33 which may be of any approved construction, preferably of tapered formation, projecting forwardly from the machine at opposite sides of the entrance to the passageway 14. They are thus adapted to enter the crop and to guide a swath thereof into the entrance of the passageway 14, slightly bending the stalks to the side. The rods of the outer fender 32 project laterally and some of them extend rearwardly over and past the grain wheel 12 to thus prevent the crop becoming entangled in the wheel or beaten to the ground before the seed has been harvested.

Means are provided for raising and lowering the implement frame to adjust the implement for various heights of the standing clover. These adjusting means are mainly common to many types of agricultural implements such as binders but their construction will be briefly described. The shaft of the drive wheel 11 has a pinion relation to an arcuate rack 34, a worm gearing being also provided for raising or lowering the arcuate rack 34 with respect to the drive wheel axis. The arcuate rack 34 is rigidly secured to the frame of the implement so that the implement frame as a whole may be raised or lowered by turning the worm shaft 35. The grain wheel 12 is also provided with raising and lowering means. The grain wheel 12 is mounted on a crank axle 36 which is journaled in the implement frame. The lever 37 and its brace 38 are also securely anchored to the implement frame. The lever 37 is maintained in fixed position by means of a chain 39 or other suitable flexible member having one end secured to the lever 37 and the other end releasably secured to a hook 40.

From the foregoing description taken in connection with the accompanying drawings, it will be understood that as the machine is drawn over the field the clover will be divided so as to clear a path for the grain wheel 12 and direct some of the grain into the passageway 14 through the seed house. The inclined formation of the passageway with the inclination of the guide rods causes the stems of the plants to bend toward the left as shown in Figure 1 so that as the beater rotates it will impinge on the upper ends of the plants to drive the seed therefrom. The ripe clover seed may be easily removed from the plants by beating them in the manner shown and the beating of the plants will tend to beat them against the grid or grizzly formed by the parallel rods 17 so that as the travel of the implement continues, the grid will exert a racking action upon the ends of the plants and the passage of the standing grain will tend to brush the grid rods so that all of the seed will be effectually removed so that it will fall through between the rods and into the bin. As one blade of the beater clears the plants the plants tend to straighten but they are immediately struck by a succeeding blade so that they are effectually relieved of all seed. The travel of the machine brings the roller 31 against the plants so that they bend forward to receive a final impact from the beater without being permitted to curl around the rear end of the beater shaft 18. The sweet clover seed is thus gathered during the travel of the machine and it accumulates inside the seed receptacle. This receptacle is provided with a door 41 for the removal of the seed, the door 41 being preferably in the rear wall of the seed house.

Having thus described my invention in such full, clear, and exact terms that its construction and operation will be readily understood by others skilled in the art to which it pertains, what I claim as new and desire to secure by Letters Patent of the United States is:

1. A clover harvester comprising a portable seed house having a passageway therethrough to receive standing plants, a rotatable beater mounted in the upper portion of the passageway and extending longitudinally of the same adapted to act upon the upper ends of the plants, a bin below the beater to receive the collected crop, and a grid extending over the bin for raking contact with the bent plants permitting the seed to pass through and fall into the bin but holding back the coarser trash and causing it to fall to the ground.

2. A clover harvester comprising a seed house having a passageway therethrough from front to rear, a beater at one side of the passageway to impinge upon the plants and drive the crop therefrom, and a transverse roller on the rear wall of the seed house below the beater to bend the plants forwardly under the beater.

HENRY G. GUYLE.